United States Patent Office 2,859,806
Patented Nov. 11, 1958

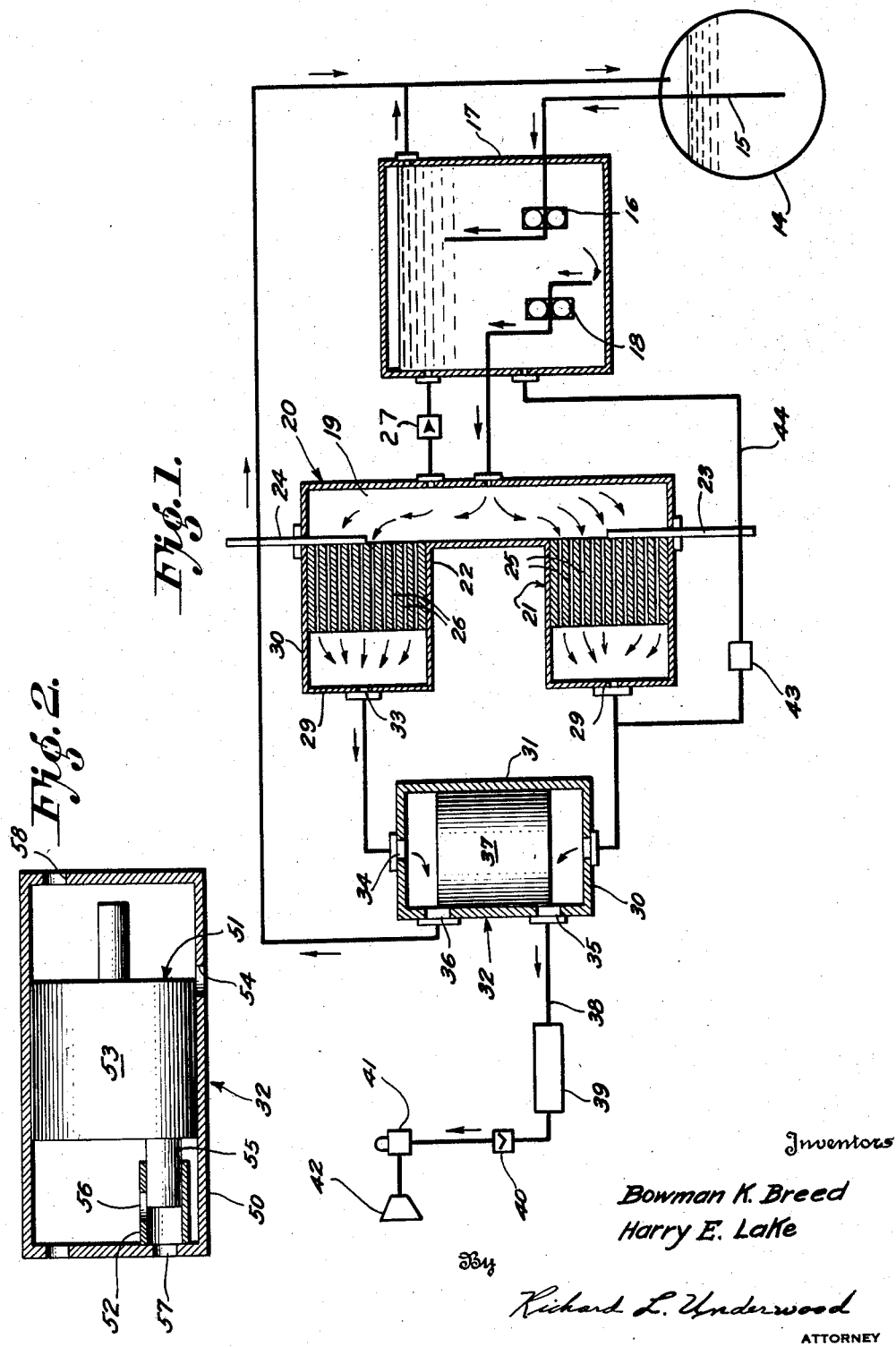

2,859,806
LIQUID FLOW CONTROL REGULATOR

Harry E. Lake, Bethel, Conn., and Bowman K. Breed, Chicago, Ill., assignors to Preferred Utilities Manufacturing Corporation, New York, N. Y., a corporation of Delaware Application December 2, 1953, Serial No. 395,728

1 Claim. (Cl. 158—36.3)

Our invention relates to apparatus for providing a constant flow of oil to an atomizer in an oil burner system which is unaffected by the various viscosities encountered and the various pressures developed in the feed system and the bypass or return system.

More particularly our invention relates to an oil burner supply system having in combination an adjustable flow proportioning device for providing a predetermined constant flow of oil at its feed outlet and its return outlet regardless of changes in viscosity of the oil or pressure upstream of said device and a pressure equalizing means for providing equal back pressures at the feed outlet and the return outlet, thereby maintaining a constant rate of flow to the atomizer regardless of the back pressures of the feed line and the return line.

Our invention employs an adjustable flow proportioning device, an example of which is shown in the Harry E. Lake Patent No. 2,006,865, issued on July 2, 1935. The patented proportioning device has earned an enviable reputation in the industry and is known as the "Volu-Valve" device. Over the years the patented device has given highly satisfactory service for many installation designs. Briefly, the patented device has a common inlet which is supplied with oil at a constant rate by a positive displacement pump. The flow of oil then divides, one part passing through a feed unit, the other part passing through a return unit. Each unit has a group of identical, minute passages, each of which causes a pressure drop due to friction exactly the same as the others. Adjustable means are provided for varying proportionately the number of these small passages in each unit which are in fluid communication with the common inlet. The feed unit supplies oil to a feed outlet for routing to the burner discharge nozzle and the return unit supplies oil to a return outlet for routing back to the storage tank.

It is obvious that if feed outlet pressure differs from the return outlet pressure (the inlet pressures being the same), the actual flow through a given number of passages in the flow proportioning device will be upset by the proportionate differences in the feed and return outlet back pressures. The patented flow proportioning device eliminated the effect of this back pressure variation by providing a pressure drop through the passages sufficient to render unimportant any back pressure variations encountered in many installation designs.

Our invention provides an improved system which is more versatile and more adaptable than the known flow proportioning devices to the many odd and extreme requirements of today's more complex burner installation designs. Present day installation designs due to space limitations or safety requirements at times place the oil storage tank at a great distance from and at an elevation above the oil burner itself, thereby causing an extremely high back pressure to be present at the return outlet of the flow proportioning device, particularly when starting the burner with relatively cold oil. Further the designs include various networks of curves, elbows and the like which develop high back pressures. Due to periodic changes in the piping systems and other similar reasons, it has become extremely difficult today to manufacture a flow proportioning device which will meet every installation design.

It will be readily appreciated that the increased return line back pressure upon initial starting with cold oil is particularly detrimental. It is to the alleviation of this problem as well as the others mentioned herein that our invention is directed.

Our invention provides means for equalizing the back pressures at the feed and return outlets of the flow proportioning unit to insure a constant flow of oil to the discharge nozzle regardless of the pressure upstream of said flow proportioning device, the viscosity of the oil, the back pressure of the feed line, and the back pressure of the return line.

Another feature which is demanding attention in the design of oil burners is the quality of oil available for economic use in the burners. The oil is usually a No. 6 oil which lies between a minimum viscosity of 45 sec. S. F. at 122° F. and a maximum viscosity of 300 sec. S. F. at 122° F. Local conditions sometimes require a burner designed for handling high viscosity oil to use temporarily a low viscosity oil. The obtaining of low fire start, satisfactory combustion rates, and constant metering of the oil under these varying conditions has presented a serious problem. No. 6 oil today is listed as having a minimum of 140° F. Flash Point which means, at atmospheric pressure, if the oil is heated above 140° F., gas will form in the feed pipe and cause erratic firing of the fuel. By means of the back pressure valve, the oil can be kept at a sufficiently high pressure so that the oil can be heated to proper burning temperature which today is around 175° F. without vaporizing.

Our invention provides automatic starts and smooth quiet combustion of the heavy grades of No. 6 oil by the installation of a heater in the feed line upstream of the back pressure valve which prevents vaporization of the oil.

Summarizing briefly, our invention comprises a flow proportioning device capable of dividing a single stream into two streams which flow at predetermined constant rates from its first and second outlets regardless of changes in viscosity of the fluid or pressures upstream thereof in combination with a pressure equalizing means which maintains equal back pressures at the first and second outlets of the flow proportioning device. The pressure equalizing valve is correctively responsive to variations of the back pressures in the two fluid networks downstream of the flow proportioning device. It includes two chambers, each of which is in fluid coupling communication with its respective flow proportioning device outlet and downstream fluid network. Movable means within the pressure equalizing valve is designed to respond to a difference in back pressures of the two downstream fluid networks and correctively adjust the pressure drop across at least one of the chambers, thereby equalizing the back pressures at the first and second outlets of the flow proportioning device. The two paths of flow are thereby under equalized pressure, thus establishing constant flow ratios with variable pressure input.

Various other objects and meritorious features of the invention will be apparent from the following description taken in conjunction with the drawings wherein like numerals refer to like parts throughout the figures and wherein:

Fig. 1 is a schematic view of the instant oil burner supply system, the piping being shown as single lines for clarity; and Fig. 2 is a side view in section showing a modification of the pressure equalizing valve.

Referring now to the schematic view in Fig. 1, it will be seen that our oil burner supply system includes a storage tank 14 into which extends a suction line 15 which supplies oil to a primary supply pump 16, the oil from this pump passing into a low pressure chamber 17. A secondary constant displacement discharge pump 18 which is submerged in the low pressure chamber 17 delivers oil to a high pressure chamber 19 which is the common inlet for the adjustable flow proportioning device 20, this device being made up of two exactly similar units, namely, a feed unit 21 and a return unit 22. Suitable adjusting means 23 and 24 are provided for regulating the number of open passages 25 and 26, respectively. These means may be synchronized and operated automatically to produce a straight line variation flow, suitable simultaneous adjusting means, for example, being shown in the Lake Patent No. 2,006,865 (Fig. 8); the sum of the number of holes open in both units 21 and 22 is constant. This means that when adjusting means 23 is open, adjusting means 24 would be closed and full flow would go to the burner from the secondary pump 18. If half of the holes in each unit are closed, one-half of total flow from the secondary pump 18 would pass to the burner and one-half through the return line to the tank 14. The passages are formed in groups in each unit and are identical, small cross-sectional area supply passages. The feed outlet 29 is connected to the feed end 30 of a cylinder 31 of a pressure equalizing means or valve 32 and the return outlet 33 is connected to the return end 34 of this cylinder. The side wall of the cylinder adjacent the feed end is fitted with a feed port 35 and the side wall of the cylinder adjacent the return end is fitted with a return port 36. Relief valved line 27 protects device 20 from accidental excessive pressure conditions caused, for example, by a clogging of the small diameter passages 26 and 25 by providing a return line to the chamber 17.

A free sliding compensating piston 37 is positioned within the cylinder 31, the piston being of sufficient length to overlap one of the ports when the other is wide open.

A feed line 38 from the feed port 35 carries the oil through a low density electric heater 39 and then through a back pressure valve 40. A low density heater has a low wattage per square inch of blade surface exposed to the oil. In having the larger amount of surface per kw., the temperature of the blade can be lower for heating the oil up to say 175° and this lower temperature is required to prevent the oil from "coking" on the blades and in the manifold during the "off" period of operation. It also gives the thermostat an opportunity to regulate the temperature of the oil within closer limits thus giving a minimum of temperature variation when various amounts of oil are drawn through the electric heater manifold.

The oil passes from the back pressure valve 40 through an electrically controlled solenoid oil shut-off valve 41. This shut-off valve is installed for several reasons, one of which is to prevent oil feeding to the burner discharge nozzle 42 at times when it may be desirable to have the oil pumps running without burning the oil. Under these conditions no flow of oil can take place through the feed unit 21, as there is no outlet from this unit. Since the secondary discharge pump 18 must obviously displace its constant volume of oil, all of the oil thus displaced must pass through the holes in the return unit 22. Under these conditions the pressure in the high pressure chamber 19 builds up rapidly and this pressure is exerted through the feed end 30 of the equalizing valve 32 on the solenoid valve 41. The pressure is therefore abnormally high under these conditions and may reach a point where the solenoid valve will become jammed and fail to open when the burner is again started. A relief valve 43 set somewhat above the normal pressures expected at the cylinder feed end 30 is placed in a relief line 44 from the feed outlet 29 to the low pressure chamber 17, thereby preventing excessive build-up of pressure in the feed line 38. When the back pressure valve 40 is used, the relief valve 43 is set about 10 p. s. i. above the setting of the back pressure valve 40. This would mean that when the solenoid valve is closed and a pressure of 30 lbs. is built up, the oil will by-pass through this relief valve 43 to the low pressure side of the reservoir 17 and since the solenoid valve 41 will open against a higher pressure than 30 lbs., there will be no difficulty in maintaining automatic operation. When the solenoid valve does open, 20 lbs. of oil pressure is required to pass the oil through the back pressure valve which is set at 20 lbs., and since the relief valve is set 10 lbs. higher, then there will be no oil passing through the relief valve to the low pressure side of the reservoir. It will be appreciated that an abnormally high pressure condition in the feed line would produce a very poor as well as dangerous ignition condition due to possible air pockets in the line.

In Fig. 2, we have shown a modification of the equalizing valve 32 which has a cylinder 50 in which the four fluid connections for providing fluid communication to the rest of the system comprise ports, the openings of two of which are varied by a piston 51. The cylinder 50 has a smaller secondary cylinder 52 mounted therein at one end. The piston 51 has a large section 53 which controls the opening of port 54 and a small extension piston 55 which slides in cylinder 52 and controls port 56. Two other ports 57 and 58 are present in their respective ends of cylinder 50. It will be readily appreciated that many modifications are possible in the design of the equalizing valve 32 including variations in the port design and the substitution of valve mechanisms for the ports.

When the burner of our invention is in operation, the primary supply pump 16 delivers oil to the low pressure chamber 17. The submerged secondary pump 18 then delivers a constant volume of oil to the chamber 19 for proportioned routing through the feed unit 21 and return unit 22 in accordance with the setting of the adjusting means 23 and 24, respectively. The oil from the feed outlet 29 passes to the feed end 30 of the equalizing valve 32, the oil from the return outlet 33 to the return end 34.

The feed oil then passes through feed port 35 to the feed line 38 for delivery to the burner nozzle 42; and the return oil passes through return port 36 to the storage tank 14.

The compensating piston 37 inside the equalizing valve 32 is of sufficient length to overlap one of the ports when the other port is wide open. This construction causes the compensating piston 32 to assume a position that will create a restriction to the flow of oil from the port having the lower back pressure that will exactly equal or balance the higher back pressure. Thus the oil pressure in the two ends of the equalizing valve 32 will always be equal. Consequently the back pressure on the passages of the feed unit 21 and the return unit 22 will always be equal. As a result of equalizing the back pressures on the downstream side of the passages in the feed and return units, the constant quantity of oil delivered to the flow proportioning device 20 is divided in its flow to the burner nozzle 42 and the storage tank 14 in the exact proportion of the number of holes opened to the two paths of flow regardless of the viscosity of the oil and regardless of the variation in the resistance of flow from the flow proportioning device 20 to the atomizer 42 and to the storage tank 14.

This results in the burner nozzle always receiving its adjusted amount of oil at start and at all proportional rates of firing from low fire adjustment to maximum fire adjustment.

To provide automatic starts after shutdown and to obtain complete and quiet combustion when handling the heavy grades of No. 6 fuel oil which require preheating to temperatures above 145° F., a low density electric heater 39 is installed upstream of the back pressure valve 40. The low density heater 39 in combination with a proper spring loaded back pressure valve 40 provides the means for raising the temperature of the oil to the required burning temperature. A suitable thermostat (not shown)

in the heater is adjustable to oil temperatures up to 200° F. The design of the low density heater in combination with the required oil pressure prevents the oil from vaporizing at these relatively high temperatures. Vaporizing in the line between the oil heater and back pressure valve results in "blurping" in the nozzle and consequent unsatisfactory burning. The term "blurping" is understood in the somewhat limited oil burner field to mean the expansion of gas or vapors in a liquid system, this expansion being held to a reduced volume by pressure. The small gaseous zones then travel through an extended pipeline and in this travel intermingle with each other causing the production of enlarged and dangerous gas zones. Upon release from the pressured zone, these enlarged pockets expand and result in an uneven delivery of fuel to a burner nozzle causing a dangerous firing condition and an intermittent flame propagation. This is a very unsatisfactory condition overcome by the instant invention.

In view of the foregoing, various modifications of our invention described herein will be apparent to those skilled in the art without departing from the spirit and scope thereof.

We claim:

In an oil burner supply system, the combination of means including an adjustable proportioning device to provide a constant flow of oil regardless of changes in viscosity or pressures upstream of said device, said device having a common inlet supplied with oil by a pump, a feed outlet and a return outlet, each outlet being connected to said inlet by a viscosity sensitive restrictor, each restrictor having means for regulating the restriction; an equalizing valve for equalizing the back pressures at said feed outlet and said return outlet, said equalizing valve having a cylinder, said cylinder having a return end and a feed end, a return line connecting said return outlet to said return end, a feed line connecting said feed outlet to said feed end, a return port in said cylinder adjacent said return end, a feed port in said cylinder adjacent said feed end, a compensating piston freely positioned within said cylinder, a burner nozzle feed line connected to said feed port for delivering oil to a burner nozzle, a heater positioned in said burner nozzle feed line upstream of the burner nozzle for heating the oil to a predetermined temperature suitable for most efficient ignition and burning, a back pressure valve positioned in said burner nozzle feed line between said nozzle and said heater for preventing vaporization of the heated oil in the burner nozzle feed line from the heater to insure safe and efficient operation, a shut-off valve positioned in said burner nozzle feed line between said burner nozzle and said heater back pressure valve, a relief line connected to said first mentioned feed line, and a relief valve positioned in said relief line having a pressure sensitivity higher than the back pressure valve for preventing pressure at said shut-off valve sufficient to render the same inoperative.

References Cited in the file of this patent

UNITED STATES PATENTS

| | | |
|---|---|---|
| 1,554,868 | McAndrews | Sept. 22, 1925 |
| 1,654,614 | Smith | Jan. 3, 1928 |
| 2,006,865 | Lake | July 2, 1935 |
| 2,199,454 | Andler et al. | May 7, 1940 |
| 2,200,578 | Mahon | May 14, 1940 |
| 2,597,177 | Plass | May 20, 1952 |
| 2,661,757 | Lines | Dec. 8, 1953 |

FOREIGN PATENTS

| | | |
|---|---|---|
| 755,130 | Germany | May 24, 1954 |

UNITED STATES PATENT OFFICE
CERTIFICATE OF CORRECTION

Patent No. 2,859,806                                        November 11, 1958

Harry E. Lake et al.

It is hereby certified that error appears in the printed specification of the above numbered patent requiring correction and that the said Letters Patent should read as corrected below.

Column 6, line 16, after "said" strike out "heater".

Signed and sealed this 24th day of March 1959.

(SEAL)
Attest:

KARL H. AXLINE
Attesting Officer

ROBERT C. WATSON
Commissioner of Patents